(12) United States Patent
Hoffman (10) Patent No.: US 7,151,338 B2
(45) Date of Patent: Dec. 19, 2006

(54) INORGANIC ELECTROLUMINESCENT DEVICE WITH CONTROLLED HOLE AND ELECTRON INJECTION

(75) Inventor: Randy Hoffman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 10/677,940

(22) Filed: Oct. 2, 2003

(65) Prior Publication Data

US 2005/0073246 A1 Apr. 7, 2005

(51) Int. Cl.
H05B 33/00 (2006.01)

(52) U.S. Cl. .................. 313/503; 313/506; 428/917

(58) Field of Classification Search ............. 313/503, 313/506; 428/917; 315/169.3
See application file for complete search history.

(56) References Cited

U.S. PATENT DOCUMENTS

| | | |
|---|---|---|
| 2,817,783 A | 12/1957 | Loebner |
| 3,242,368 A | 3/1966 | Donald et al. |
| 3,267,317 A | 8/1966 | Fischer |
| 3,353,114 A | 11/1967 | Hanks et al. |
| 3,492,548 A | 1/1970 | Goodman |
| 3,510,714 A | 5/1970 | Hehmann |
| 3,541,375 A | 11/1970 | Aven |
| 3,544,864 A | 12/1970 | Richman |
| 3,978,507 A | 8/1976 | Fertin |
| 4,081,764 A | 3/1978 | Christmann et al. |
| 4,152,711 A | 5/1979 | Nakata |
| 4,197,552 A | 4/1980 | Walker et al. |
| 4,458,261 A | 7/1984 | Omura |
| 4,486,499 A | 12/1984 | Morimoto |
| 4,554,485 A | 11/1985 | Yamada |
| 4,766,471 A | 8/1988 | Ovshinsky et al. |
| 4,847,609 A | 7/1989 | Kuwata et al. |
| 4,882,295 A | 11/1989 | Czubatyj et al. |
| 4,958,898 A | 9/1990 | Friedman et al. |
| 5,055,363 A * | 10/1991 | Tomomura et al. ......... 428/690 |
| 5,097,298 A | 3/1992 | Ehara |
| 5,648,181 A | 7/1997 | Watanabe |
| 5,652,067 A | 7/1997 | Ito et al. |
| 5,663,573 A | 9/1997 | Epstein et al. |
| 5,850,123 A | 12/1998 | Potter |
| 5,958,573 A | 9/1999 | Spitler et al. |
| 6,433,355 B1 | 8/2002 | Riess et al. |
| 6,448,950 B1 | 9/2002 | Cheng |
| 6,524,884 B1 | 2/2003 | Kim et al. |
| 6,573,651 B1 | 6/2003 | Adachi et al. |
| 6,577,058 B1 | 6/2003 | Ossipov et al. |
| 6,777,724 B1 * | 8/2004 | Duggal et al. .............. 257/184 |
| 2002/0047176 A1 | 4/2002 | Takahashi |

(Continued)

FOREIGN PATENT DOCUMENTS

EP 1089595 4/2001

(Continued)

OTHER PUBLICATIONS

European Search Report dated Jan. 25, 2005.

(Continued)

*Primary Examiner*—Ashok Patel (57) ABSTRACT

An electroluminescent device using an inorganic phosphor configured to produce electroluminescence from the recombination of injected holes and injected electrons is disclosed. A controllable hole injection structure in contact with the inorganic phosphor controls a rate of hole injection into the inorganic phosphor based on a first applied control voltage. A controllable electron injection structure in contact with the inorganic phosphor and separated from the controllable hole injection structure controls a rate of electron injection into the inorganic phosphor based on a second applied control voltage.

39 Claims, 8 Drawing Sheets

U.S. PATENT DOCUMENTS

2002/0139985 A1 10/2002 Matsuo et al.
2004/0032208 A1* 2/2004 Wu et al. .................... 313/509
2004/0174117 A1* 9/2004 Han ........................... 313/506

FOREIGN PATENT DOCUMENTS

EP 1143 773 10/2001
GB 2330451 4/1999

OTHER PUBLICATIONS

English translation of Taiwan Office Action dated Feb. 17, 2005.

* cited by examiner

INORGANIC ELECTROLUMINESCENT DEVICE WITH CONTROLLED HOLE AND ELECTRON INJECTION

BACKGROUND OF THE INVENTION

Electroluminescent (EL) devices hold the promise of providing a display technology superior to the cathode ray tube and liquid crystal displays in widespread use today. Although various EL devices have been known for years, development of EL displays has been relatively slow due to a number of technical challenges.

At least two different types of EL devices are known: tunneling EL devices and diode junction EL devices. Tunneling EL devices may be fabricated by placing a phosphor material between two electrodes and placing an insulating layer between one or both electrodes and the phosphor. Injection of carriers is accomplished by imposing a high voltage across the phosphor that enables tunneling of carriers, typically electrons, through the insulating layer. The high electric field accelerates the injected carriers that then interact with luminance centers within the phosphor resulting in emission of visible light.

Diode junction EL devices, on the other hand, are fabricated by doping the phosphor material to create a PN junction. Under forward bias conditions, holes and electrons recombine near the PN junction to emit light.

Both types of EL devices suffer from a number of problems, however, due to the high voltages required to inject carriers. High voltages in the phosphor region accelerate carriers to high velocities, such that many of the charge carriers pass quickly through the phosphor region without recombining or interacting with the luminance centers of the phosphor. The charge carriers do not contribute to electroluminescence, and hence, they create a wasteful leakage current, which lowers efficiency. Furthermore, high voltages can lead to catastrophic breakdown of the insulating layers or phosphor, destroying the device.

Fabrication of diode junction EL devices is also difficult since doping of most inorganic phosphors is difficult to achieve, limiting the choice of inorganic phosphor materials suitable for commercial EL devices. For those phosphors that can be doped, doping is typically limited to one carrier type, thus, limiting the efficiency of the devices.

Although the lower carrier mobility of organic phosphors can result in improved functionality, organic phosphors present a whole new set of difficulties. Organic phosphors tend to be highly chemically reactive and can rapidly degrade if exposed to the environment. The high reactivity of organic phosphors also limits the choices of materials that can be used for electrodes, since many organic phosphors will readily combine with the metal in the electrode, resulting in degradation of the device performance. Practical devices using an organic phosphor require special chemical isolation layers at the junctions and careful packaging to manage the reactivity of the phosphor. Achieving long life with organic phosphors has also proven difficult.

SUMMARY OF THE INVENTION

It has been recognized that it would be advantageous to develop an efficient electroluminescent device based on hole and electron injection and recombination in an inorganic phosphor.

One embodiment of the present invention includes an electroluminescent device configured to produce electroluminescence from the recombination of injected holes and electrons in an inorganic phosphor. The electroluminescent device includes a controllable hole injection structure in contact with the inorganic phosphor. A first applied control voltage controls a rate of hole injection into the inorganic phosphor. The embodiment of an electroluminescent device also includes a controllable electron injection structure in contact with the inorganic phosphor and separated from the controllable hole injection structure by a recombination region of the inorganic phosphor. A second applied voltage controls the rate of electron injection into the inorganic phosphor.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
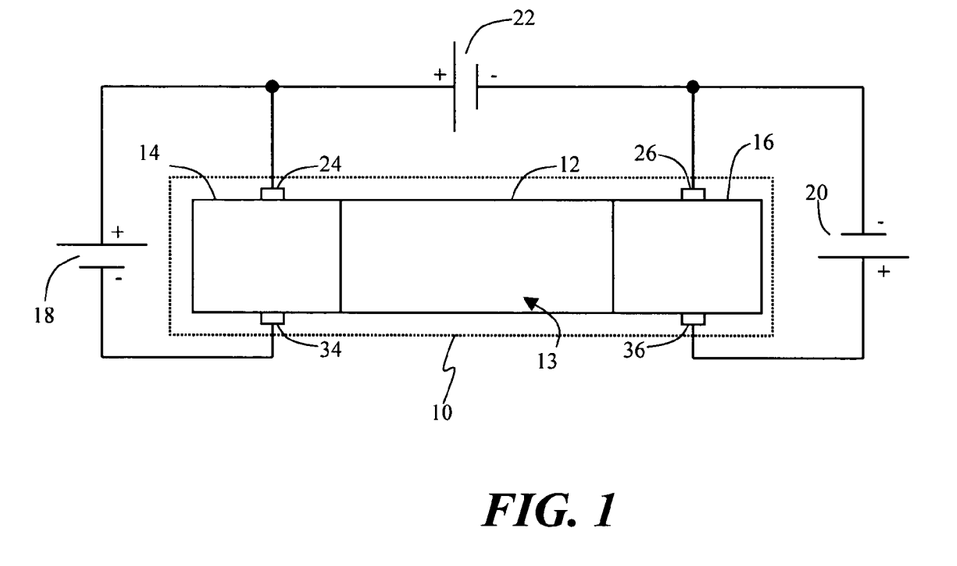
FIG. 1 is a schematic view of an electroluminescent device in accordance with an embodiment of the present invention.

An embodiment of an electroluminescent device is illustrated in FIG. 1, indicated generally at 10, in accordance with an embodiment of the present invention. The electroluminescent device 10 includes an inorganic phosphor 12 configured to produce electroluminescence from the recombination of injected holes and electrons. Exemplary materials which may be used for the inorganic phosphor 12 include ZnS, SrS, BaS, CaS, ZnO, ZnSe, GaN, and GaP.

The electroluminescent device 10 also includes a controllable hole injection structure 14 and a controllable electron injection structure 16 each separated from each other and in contact with the inorganic phosphor 12. A hole injection control voltage 18 may be applied across the hole injection structure 14 using the anode contact 24 and the hole injection control gate contact 34 to create a sufficiently high E-field intensity within the hole injection structure 14 to enable the injection of holes from the anode contact 24. The hole injection control voltage 18 may be varied to control the rate of hole injection. An electron injection control voltage 20 may be applied across the electron injection structure 16 using the cathode contact 26 and the electron injection control gate contact 36 to create a sufficiently high E-field intensity within the electron injection structure 16 to enable the injection of electrons. The electron injection control voltage 20 may be varied to control the rate of electron injection. High E-field intensities created by the control voltages 18, 20 are substantially contained within the injection structures 14,16 in part because of the separation of the injection structures 14, 16 from each other and in part because of the separation of the injection structures 14,16 from a recombination region 13 of the inorganic phosphor 12.

An electroluminescence voltage 22 may be applied between the hole injection structure 14 and the electron injection structure 16 and, thus, across the inorganic phosphor 12. As the electroluminescence voltage 22 is made increasingly positive, the resulting E-field across the inorganic phosphor 12 will draw holes and electrons away from the injection structures 14, 16, respectively and toward each other, where they will radiatively recombine in the recombination region 13 of the inorganic phosphor 12, producing electroluminescence. Relatively low electroluminescence voltage 22 can be used to produce appreciable electroluminescence because the flow of carriers is a bulk drift current. By avoiding high E-fields in the recombination region 13, the velocity of carriers is kept relatively low, thus reducing the number of carriers that pass through the inorganic phosphor 12 without recombining. The efficiency of the electroluminescent device 10 is thus enhanced.

Figure 2:
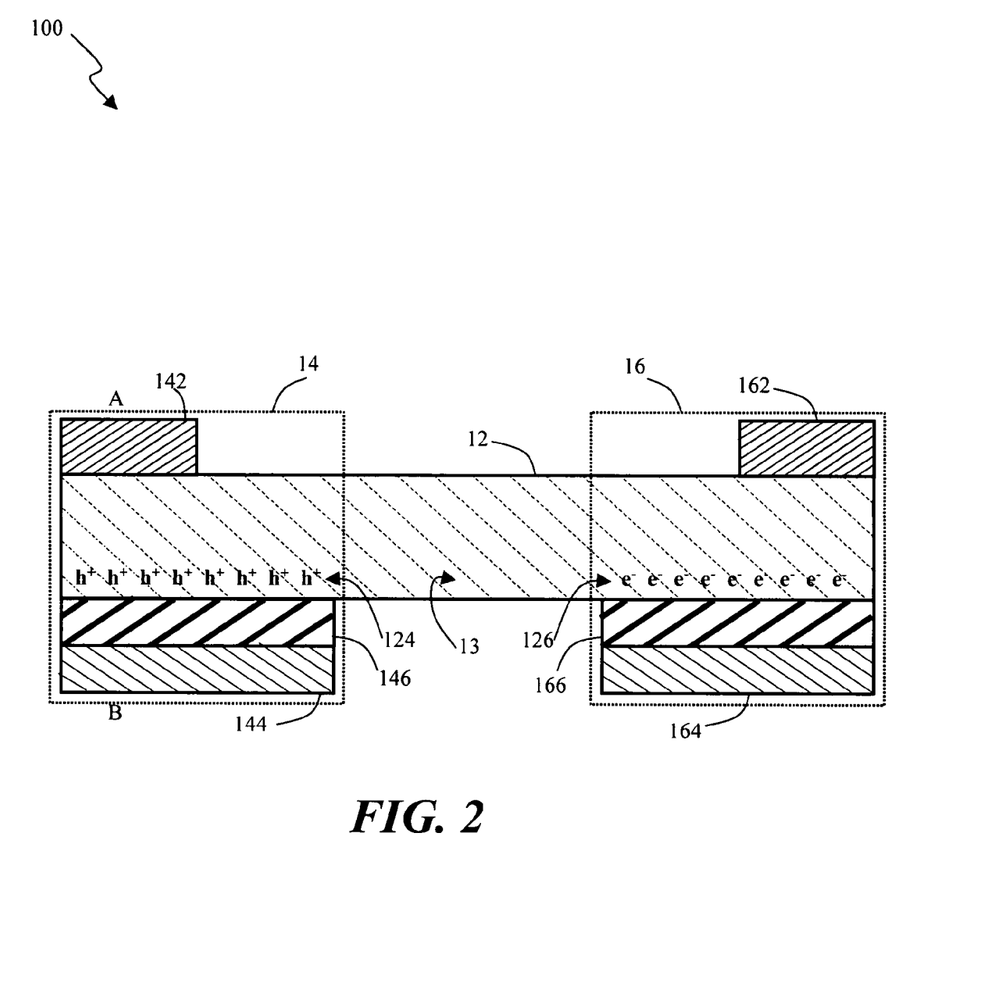
FIG. 2 is a sectional view of an electroluminescent device in accordance with another embodiment of the present invention.

FIG. 2 provides further detail of an electroluminescent device, indicated generally at 100, in accordance with another embodiment of the present invention. The electroluminescent device 100 includes a controllable hole injection structure 14, including a hole injection region 142 in contact with the inorganic phosphor 12. The controllable hole injection structure 14 also includes a field effect gate structure including a hole injection control gate 144 and a hole injection control gate insulator layer 146. The hole injection control gate 144 is located opposite the hole injection region 142, but separated from the inorganic phosphor 12 by the hole injection control gate insulator layer 146.

The electroluminescent device 100 may further include a controllable electron injection structure 16 including an electron injection region 162 in contact with the inorganic phosphor 12. The controllable electron injection structure 16 also includes a field effect gate structure including an electron injection control gate 164 and an electron injection control gate insulator layer 166. The electron injection control gate 164 is located opposite the electron-injection region 162, but separated from the inorganic phosphor 12 by the electron injection control gate insulator layer 166. Although the hole injection control gate insulator layer 146 and electron injection control gate insulator layer 166 are shown as two separate regions, they may be formed as one continuous layer according to another embodiment of an electroluminescent device in accordance with the present invention.

Figure 3:
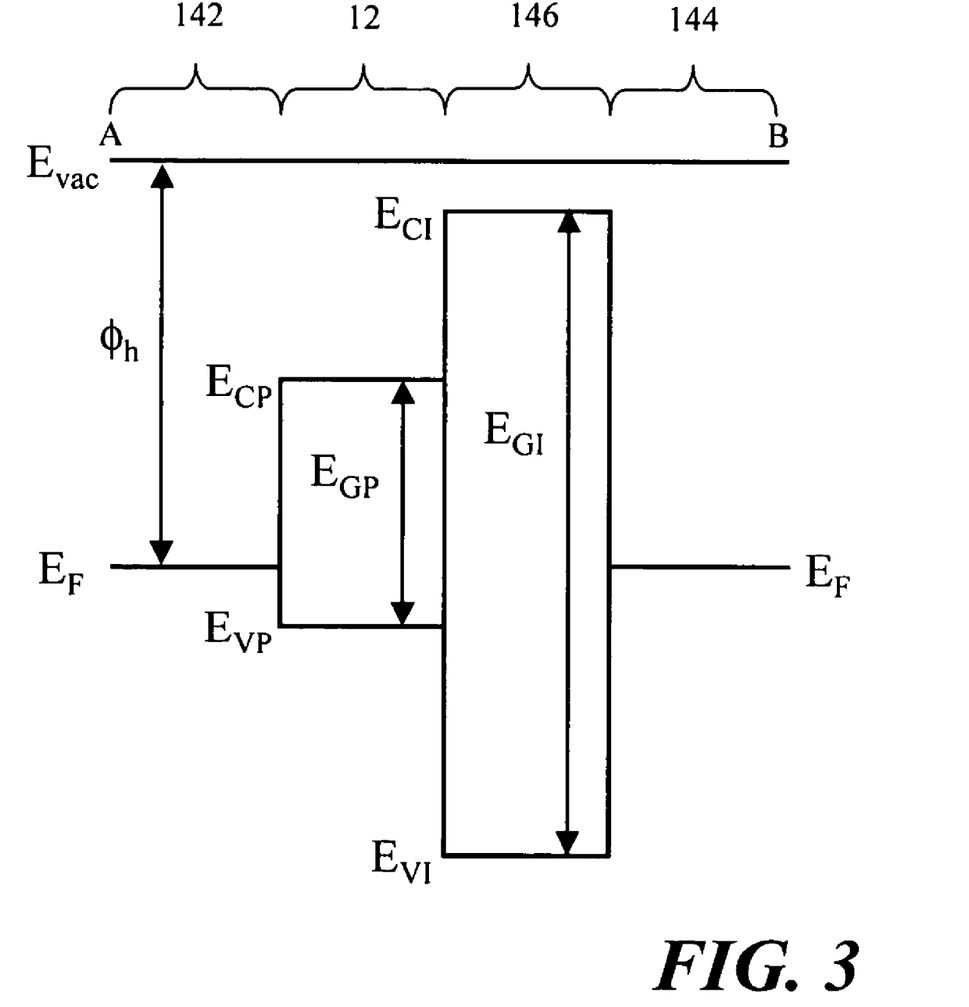
FIG. 3 is an energy band diagram for the electroluminescent device of FIG. 2 with no applied voltage.
Figure 4:
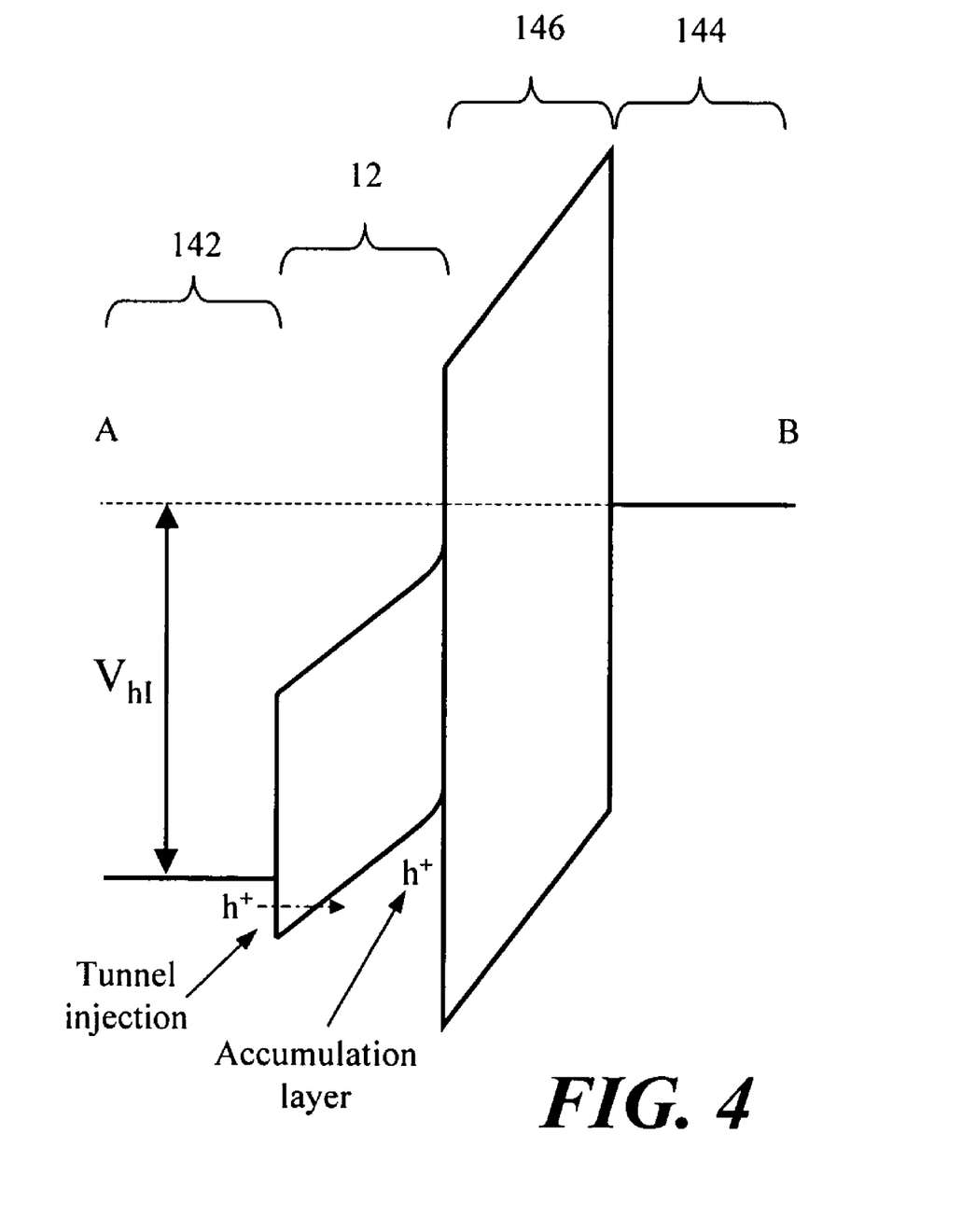
FIG. 4 is an energy band diagram for the electroluminescent device of FIG. 2 with sufficient applied voltage to cause electroluminescence.

Operation of the electroluminescent device 100 can be understood by referring to the energy band diagrams of FIGS. 3 and 4. FIG. 3 illustrates an energy band diagram for the controllable hole injection structure 14 of the electroluminescent device 100 taken along a cross section from point A to point B (see FIG. 2). In FIG. 3, the hole injection control voltage 18 is assumed to be set to zero volts. $E_{vac}$ represents the vacuum energy level, and $E_F$ represents the Fermi energy level of the hole injection region 142 and the hole injection control gate 144. In FIG. 3, for illustration purposes only, it has been assumed the hole injection region 142 and the hole injection control gate 144 have identical work functions. The hole injection region 142 and hole injection control gate 144 may be fabricated of different materials. The symbol, $\phi_h$, represents the work function of the hole injection region 142. $E_{GP}$ is the energy bandgap of the inorganic phosphor 12, corresponding to the difference between the inorganic phosphor valence band maximum energy level, $E_{VP}$, and conduction band minimum energy level, $E_{CP}$. $E_{GI}$ is the energy bandgap of the hole injection control gate insulator layer 146, i.e. the difference between the insulator layer valence band maximum energy level, $E_{VI}$, and conduction band minimum energy level $E_{CI}$.

The hole injection barrier $E_F$–$E_{VP}$ may be minimized, by choosing a high work function metal for the hole injection region 142, according to embodiments of the present invention. For example, suitable high work function metals for embodiments of the present invention include Au, Pt, Pd, and Ni. In alternative embodiments of the present invention, the hole injection region 142 may be fabricated from a p-type doped semiconductor, optionally a wide bandgap semiconductor. A wide bandgap semiconductor may result in a lower hole injection barrier, particularly if it has a high electron affinity (difference between conduction band minimum and vacuum level). Examples of suitable semiconductors for embodiments of the present invention include NiO, $Cu_2O$, $Co_3O_4$, $SrCu_2O_2$, $BaCu_2S_2$, LaCuOS, GaN, and the class of materials $CuMO_2$, where M=Al, Y, Sc, Cr, In, or Ga.

The hole injection barrier remains relatively high (for example, approximately 1 eV) for practical choices of a high work function metal and inorganic phosphor. The hole injection barrier may be overcome by the hole injection control voltage 18.

FIG. 4 illustrates an energy band diagram for an embodiment of the controllable hole injection structure 14 of electroluminescent device 100 for the case where the hole injection control voltage 18 is set sufficiently high to overcome the hole injection barrier. Holes tunnel through the triangular energy barrier from the hole injection region 142 into the inorganic phosphor 12. Holes entering the inorganic phosphor 12 will be swept to the boundary between the inorganic phosphor 12 and the hole injection control gate insulator 146. Holes cannot enter the hole injection control gate insulator 146 due to a large barrier ($E_F$–$E_{VI}$) and, hence, a hole accumulation layer 124 (see FIG. 2) will form at the surface of the phosphor region directly adjacent to the hole injection control gate insulator 146.

Operation of the controllable electron injection structure 16 follows similar principles to those illustrated above and will be readily apparent to one of ordinary skill in the art and, thus, will not be further elaborated herein. Electrons are injected from the electron injection region 162 into the inorganic phosphor 12 and form an electron accumulation layer 126 at the surface of the phosphor region directly adjacent to the electron injection control gate insulator 166.

Electron injection according to embodiments of the present invention may be facilitated by the choice of a low work function metal for the electron injection region 162 (see FIG. 2), minimizing the electron injection barrier.

Examples of suitable low work function metals consistent with embodiments of the present invention include Ca, Li, K, Na, Mg, Sc, In, Al, Ti, Ta, and Ag. According to alternative embodiments of the present invention, the electron injection region 162 may be fabricated from an n-type doped semiconductor. Examples of suitable n-type doped semiconductors include ZnO, SnO$_2$, In$_2$O$_3$, GaN consistent with embodiments of the present invention. Because electron injection is generally easier than hole injection, there is more flexibility in the choice of a suitable electron injector than in the choice of a suitable hole injector.

Imposition of the electroluminescence voltage 22 will cause drift of holes and electrons within the inorganic phosphor 12 away from the accumulation layers 124,126 toward the recombination region 13, where they may recombine, producing electroluminescence. Control of the electroluminescence intensity may thus be obtained by variation of the electroluminescence voltage 22. According to alternative embodiments of the present invention, control of electroluminescence intensity may be obtained by controlling the rate of injection of either holes or electrons, or both, by varying the hole and/or injection control voltages 18, 20.

The electroluminescent device 100 thus provides three independent controls: control of electroluminescence intensity through the electroluminescence voltage 22, control of hole injection current through the hole injection control voltage 18 and control of electron injection current through the electron injection control voltage 20. Hence, efficiency of the electroluminescent device 100 may be optimized by setting the injection voltages 18, 20 to provide balanced hole and electron injection independently of control of electroluminescence intensity. Improved efficiency may also be obtained by keeping high injection E-fields away from the recombination region 13 to minimize leakage currents.

Electroluminescence produced by the device 100 may be coupled out either the top or bottom of the device. In another embodiment of the electroluminescent device, the field effect gate structures (hole injection control gate 144 and hole injection control gate insulator layer 146, and/or electron injection control gate 164 and electron injection control gate insulator layer 166) may be fabricated of a transparent material. For example, the hole injection control gate 144, or electron injection control gate 164, or both, may be formed from materials such as In$_2$O$_3$, SnO$_2$, and ZnO doped with the appropriate impurities so as to attain high conductivity.

Figure 5:
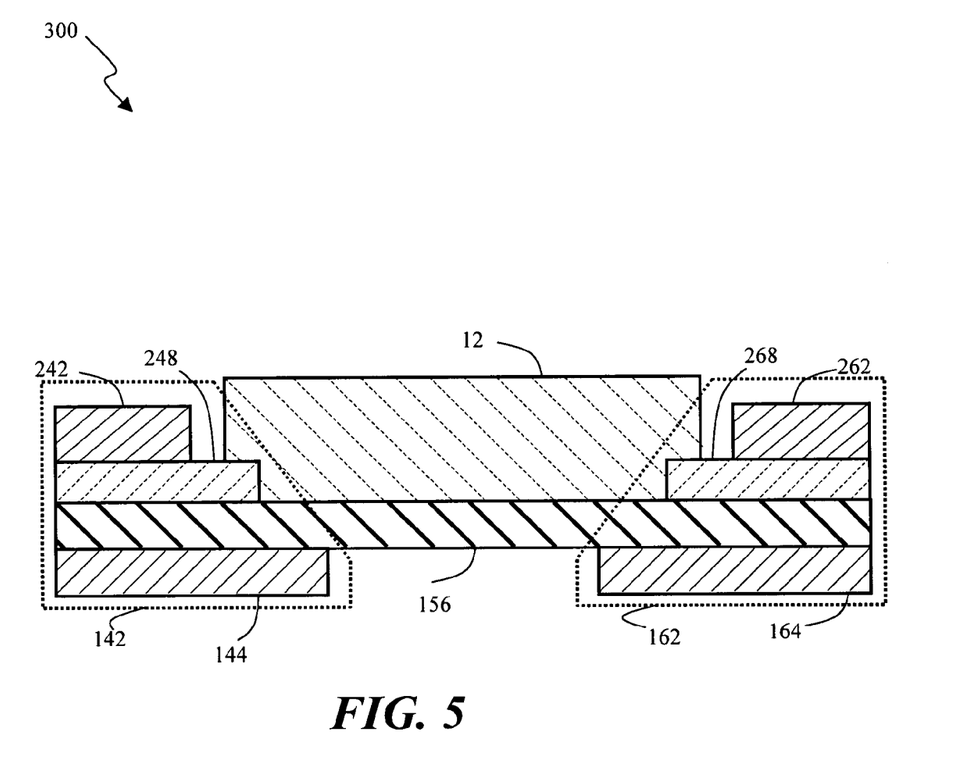
FIG. 5 is a sectional view of an electroluminescent device in accordance with another embodiment of the present invention.

FIG. 5 provides an alternate embodiment of an electroluminescent device, indicated generally at 300, in accordance with the present invention. The hole injection region 142 includes a hole injector contact 242 and a hole injector layer 248. The electron injection region 162 includes an electron injector contact 262 and an electron injector layer 268. A single gate insulator 156 spans a bottom surface of the inorganic phosphor 12 to provide both the hole and electron injection control gate insulator 146, 166, respectively.

The hole and electron injector layers 248, 268 may be formed of the same material as the inorganic phosphor 12 to facilitate flow of carriers from the injector layers 248, 268 into the inorganic phosphor 12. A reduced thickness of the injector layers 248, 268 relative to the inorganic phosphor 12 allows lower injection control voltages 18, 20. Optionally, the injector layers 248, 268 may also be doped to reduce the hole and electron injection barriers to improve carrier injection according to another embodiment of the invention.

In yet another embodiment of the electroluminescent device 300 of FIG. 5, it is desirable that a portion of the hole and electron injection control gates 144, 164 extends past the injector layers 248, 268 so they are opposite the inorganic phosphor 12 and separated by gate insulator 156. This helps to ensure that the accumulation regions extend into the inorganic phosphor 12. Otherwise, poor injection efficiency may result due to trapping of carriers within the injection layers 248, 268. In another embodiment of the present invention, the hole injector contact 242 and the electron injector contact 262 may be extended to completely cover the hole injector layer 248 and the electron injector layer 268, respectively. In still another embodiment of the present invention, the hole injector contact 242 and electron injector contact 262 may also be extended to partially cover the inorganic phosphor 12.

Figure 6:
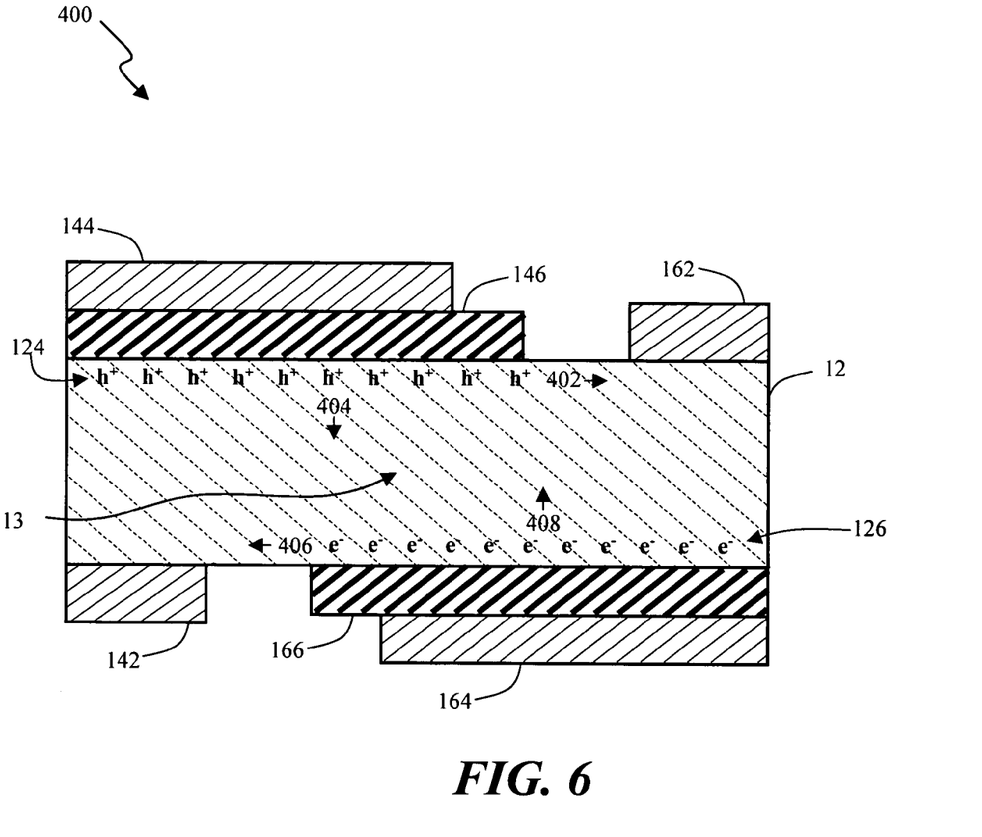
FIG. 6 is a sectional view of an electroluminescent device in accordance with another embodiment of the present invention.

FIG. 6 provides a further embodiment of an electroluminescent device, indicated generally at 400, in accordance with the present invention. In the electroluminescent device 400 of FIG. 6, the relative orientation of the electron injection structure 16 and the hole injection structure 14 has been changed relative to the embodiment illustrated in FIG. 2 to place the hole injection control gate 144 and electron injection control gate 164 on opposite sides of the inorganic phosphor 12. In another embodiment, the hole injection control gate 144 and electron injection control gate 164 may be extended, as shown in FIG. 6, so that they are partially opposite each other on opposite sides of the inorganic phosphor 12. Electroluminescent device 400 may allow improved efficiency, since drift of carriers can take place both laterally and vertically within the inorganic phosphor 12, rather than just through a surface layer as in the embodiments illustrated in FIGS. 2 and 5. For example, holes may drift from an accumulation layer 124 in directions 402 and 404. Electrons may drift from an accumulation layer 126 in directions 406 and 408. Hence, the recombination region 13 may occupy most of the inorganic phosphor 12.

Figure 7:
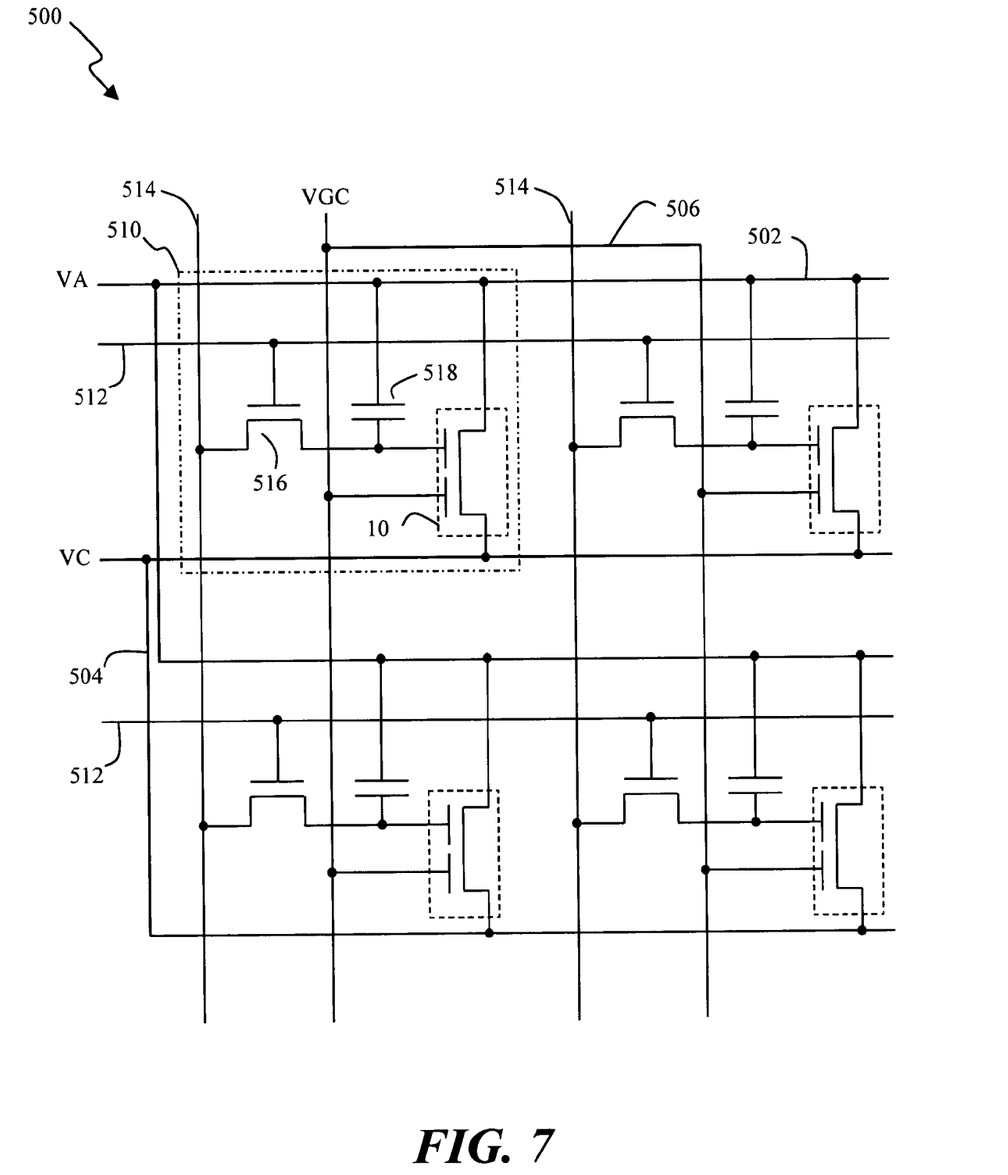
FIG. 7 is a schematic diagram of a display implemented using the electroluminescent device of FIG. 1 in accordance with another embodiment of the present invention.

A plurality of the electroluminescent devices described above may be used to implement a display. For example, FIG. 7 illustrates a schematic diagram of a display, shown generally at 500, implemented using a plurality of the electroluminescent devices 10 of FIG. 1. The electroluminescent devices 10 may be arranged in a matrix, with the anodes 24 tied to a common anode voltage bus 502, and the cathodes 26 tied to a common cathode voltage bus 504. The electron injection control gate 36 may be tied to a common electron injection control gate bias bus 506 and the hole injection control gate 34 may be used to control individual pixels 510. Individual pixels 510 may be controlled by row and column addressing, using a row (select) line 512 and a column (data) line 514. When an individual pixel 510 is selected, a transistor 516 is turned on to apply an appropriate hole injection control voltage. A capacitor 518 may be included to provide storage of the hole injection control voltage when sequential scanning of individual pixels is performed. The capacitor 518 may also be used to compensate for persistence.

According to an alternative embodiment of a display, the hole injection control gate 24 may be tied to a common hole injection control gate bias bus and the electron injection control gate 34 may be used to control the pixel 510.

An embodiment of a method 800 of fabrication of an electroluminescent device consistent with the present invention is now described. Although the fabrication of a single electroluminescent device is described, it is to be understood that an array or plurality of electroluminescent devices, for example a display, may be fabricated simultaneously using the same process.

Figure 8:
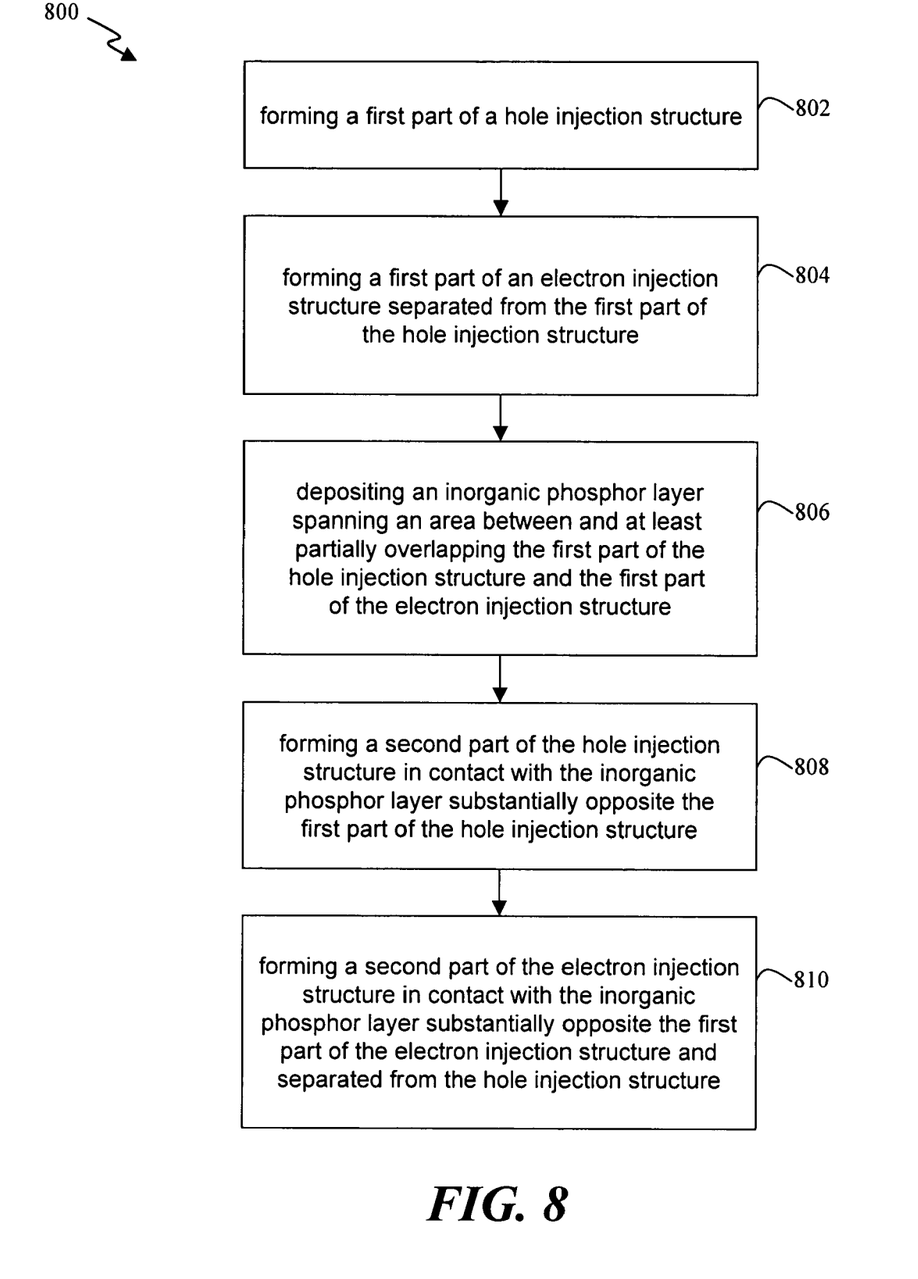
FIG. 8 is a flow chart of a method of fabrication of an electroluminescent device in accordance with an embodiment of the present invention.

Referring to FIG. 8, the method 800 may include forming 802 a first part of a hole injection structure. The method 800 may further include forming 804 a first part of an electron injection structure separated from the first part of the hole injection structure. The method 800 may further include depositing 806 an inorganic phosphor layer spanning an area between and at least partially overlapping the first part of the hole injection structure and the first part of the electron injection structure. The method 800 may further include forming 808 a second part of the hole injection structure in contact with the inorganic phosphor layer substantially opposite the first part of the hole injection structure. Finally, the method 800 may further include forming 810 a second part of the electron injection structure in contact with the inorganic phosphor layer substantially opposite the first part of the electron injection structure and separated from the hole injection structure.

According to another method embodiment, the electroluminescent device may be fabricated on a substrate, by forming the first part of the hole injection structure on a substrate and forming the first part of the electron injection structure on a substrate. The substrate may be selected to be a transparent material, for example, glass. Alternately, the substrate may be selected to be an opaque material, for example, silicon. Light may be operationally coupled out either the top, or the bottom, of the electroluminescent device. As will occur to one skilled in the art, it may be desirable to fabricate some layers, for example, the gate electrodes or injection regions, from a transparent material to allow transmission of light through those layers.

The electroluminescent device layers may be fabricated in a variety of orders. According to one alternate method embodiment, forming the first part of the hole injection structure may include forming a hole gate electrode layer and forming an insulator layer at least covering the hole gate electrode. Forming the second part of the hole injection structure may include forming a hole injection layer in contact with the inorganic phosphor and substantially opposite the first part of the hole injection structure.

According to another alternate method embodiment, forming the first part of the hole injection structure may include forming a hole injection layer. Forming the second part of the hole injection structure may include forming an insulator layer on the inorganic phosphor layer substantially opposite the first part of the hole injection structure. Forming the second part of the hole injection structure may further include forming a hole gate electrode layer on the insulator layer substantially opposite the first part of the hole injection structure.

Similarly, fabrication of the electron injecting structure layers may also be performed in a variety of orders. According to another alternate method embodiment, forming the first part of the electron injection structure may include forming an electron gate electrode layer and forming an insulator layer at least covering the electron gate electrode. Forming the second part of the electron injection structure may include forming an electron injection layer in contact with the inorganic phosphor and substantially opposite the first part of the electron injection structure. And, finally, according to another alternate method embodiment, forming the first part of the electron injection structure may include forming an electron injection layer. Forming the second part of the electron injection structure may include forming an insulator layer on the inorganic phosphor layer substantially opposite the first part of the electron injection structure. Forming the second part of the electron injection structure may further include forming an electron gate electrode layer on the insulator layer substantially opposite the first part of the hole injection structure.

Forming the first part of the hole injection structure and forming the first part of the electron injection structure may be performed simultaneously. Forming the second part of the hole injection structure and forming the second part of the electron injection structure may also be performed simultaneously. Finally, the various steps of forming an insulator layer may be performed simultaneously.

Flexibility in the fabrication of the electroluminescent device 100 may be obtained by the separate control of hole and electron injection. Since independent operational control of the hole and electron injection currents is provided by the controllable hole injection structure 14 and the controllable electron injection structure 16, the injection properties of the controllable hole injection structure 14 need not be precisely matched to the controllable electron injection structure 16. Imbalances can be adjusted at operation time by adjusting the hole and electron injection control voltages 18, 20 to achieve balanced and efficient injection.

It is to be understood that the above-referenced arrangements are illustrative of the application for the principles of the present invention. Numerous modifications and alternative arrangements can be devised without departing from the spirit and scope of the present invention. While the present invention has been shown in the drawings and described above in connection

What is claimed is:

1. An electroluminescent device comprising:
   an inorganic phosphor configured to produce electroluminescence from the recombination of injected holes and injected electrons;
   a controllable hole injection structure in contact with the inorganic phosphor; and
   a controllable electron injection structure in contact with the inorganic phosphor and separated from the controllable hole injection structure by a recombination region of the inorganic phosphor, the electron injection structure being controllable independently of the controllable hole injection structure.

2. The electroluminescent device of claim 1, wherein a first applied control voltage controls a rate of hole injection into the inorganic phosphor.

3. The electroluminescent device of claim 1, wherein a second applied control voltage controls a rate of electron injection into the inorganic phosphor.

4. The electroluminescent device of claim 1, wherein a third applied voltage controls an electroluminescence intensity produced by the device.

5. The electroluminescent device of claim 1, wherein a first applied control voltage controls a rate of hole injection into the inorganic phosphor;
   a second applied control voltage controls a rate of electron injection into the inorganic phosphor independently of the first applied control voltage;
   a third applied control voltage controls an electroluminescence intensity produced by the device independently of the first and second applied control voltage.

6. The electroluminescent device of claim 1, wherein the inorganic phosphor is selected from the group consisting of ZnS, SrS, BaS, GaS, ZnO, ZnSe, GaN, and GaP.

7. An electroluminescent device comprising:
   an inorganic phosphor configured to produce electroluminescence from the recombination of injected holes and injected electrons;
   a controllable hole injection structure in contact with the inorganic phosphor including:

a hole injection region in contact with the inorganic phosphor and configured to receive a hole-injection bias voltage, and a field effect gate structure in contact with the inorganic phosphor substantially opposite the hole injection region and configured to receive a first applied control voltage; and a controllable electron injection structure in contact with the inorganic phosphor and separated from the controllable hole injection structure by a recombination region of the inorganic phosphor.

8. The electroluminescent device of claim 7, wherein the field-effect gate structure further comprises a portion extending beyond the edge of the hole-injection region and towards the recombination region.

9. The electroluminescent device of claim 7, wherein the hole injection region has a thickness less than a thickness of the inorganic phosphor.

10. The electroluminescent device of claim 7, wherein the hole injection region is formed from the same material as the inorganic phosphor.

11. The electroluminescent device of claim 7, wherein the hole injection region is formed from a high work function metal.

12. The electroluminescent device of claim 11, wherein the high work function metal is selected from the group consisting of Au, Pt, Pd, and Ni.

13. The electroluminescent device of claim 7, wherein the hole injection region is formed from a p-type doped semiconductor.

14. The electroluminescent device of claim 13, wherein the p-type doped semiconductor is selected from the group consisting of NiO, $Cu_2O$, $Co_3O_4$, $SrCu_2O_2$, $CuAlO_2$, $CuYO_2$, $CuScO_2$, $CuCrO_2$, $CuInO_2$, $BaCu_2S_2$, LaCuOS, and GaN.

15. The electroluminescent device of claim 7, wherein the field effect gate structure is fabricated of transparent material.

16. The electroluminescent device of claim 7, wherein the field effect gate structure comprises:

an injection control gate; and an injection control gate insulator layer interposed between the injection control gate and the inorganic phosphor.

17. The electroluminescent device of claim 16, wherein the injection control gate is formed from a transparent, conductive material.

18. The electroluminescent device of claim 17, wherein the transparent, conductive material is selected from the group consisting of $In_2O_3$, $SnO_2$, and ZnO.

19. The electroluminescent device of claim 7, further comprising a hole injector contact in contact with the hole injection region.

20. The electroluminescent device of claim 19, wherein the hole injector contact is also in contact with the inorganic phosphor.

21. An electroluminescent device, comprising:

an inorganic phosphor configured to produce electroluminescence from the recombination of injected holes and injected electrons;

a controllable hole injection structure in contact with the inorganic phosphor; and a controllable electron injection structure in contact with the inorganic phosphor and separated from the controllable hole injection structure by a recombination region of the inorganic phosphor wherein the controllable electron injection structure includes:

an electron-injection region in contact with the inorganic phosphor and configured to receive an electron-injection bias voltage; and a field effect gate structure in contact with the inorganic phosphor substantially opposite the electron-injection region and configured to receive an applied control voltage.

22. The electroluminescent device of claim 21, wherein the field-effect structure further comprises a portion extending beyond the edge of the hole-injection region and towards the recombination region.

23. The electroluminescent device of claim 21, wherein the electron injection region has a thickness less than a thickness of the inorganic phosphor.

24. The electroluminescent device of claim 21, wherein the electron injection region is formed from the same material as the inorganic phosphor.

25. The electroluminescent device of claim 21, wherein the electron injection region is formed from a low work function metal.

26. The electroluminescent device of claim 25, wherein the low work function metal is selected from the group consisting of Ca, Li, K, Na, Mg, Sc, In, Al, Ti, Ta, and Ag.

27. The electroluminescent device of claim 21, wherein the electron injection region is formed from an n-type doped semiconductor.

28. The electroluminescent device of claim 27, wherein the n-type doped semiconductor is selected from the group consisting of ZnO, $SnO_2$, $In_2O_3$, and GaN.

29. The electroluminescent device of claim 21, wherein the field effect gate structure is fabricated of transparent material.

30. The electroluminescent device of claim 21, wherein the field effect gate structure comprises: an injection control gate; and an injection control gate insulator layer interposed between the injection control gate and the inorganic phosphor.

31. The electroluminescent device of claim 30, wherein the injection control gate is formed from a transparent, conductive material.

32. The electroluminescent device of claim 31, wherein the transparent, conductive material is selected from the group consisting of $In_2O_3$, $SnO_2$, and ZnO.

33. The electroluminescent device of claim 21, further comprising an electron injector contact in contact with the electron injection region.

34. The electroluminescent device of claim 33, wherein the electron injector contact is also in contact with the inorganic phosphor.

35. An electroluminescent device comprising:

an inorganic phosphor configured to produce electroluminescence from the recombination of injected holes and injected electrons;

a controllable hole injection structure in contact with the inorganic phosphor; and a controllable electron injection structure in contact with the inorganic phosphor and separated from the controllable hole injection structure by a recombination region of the inorganic phosphor wherein the controllable hole injection structure includes:

a hole injection region in contact with the inorganic phosphor and configured to receive a hole-injection bias voltage, a hole injection control gate insulator layer in contact with the inorganic phosphor substantially opposite the hole injection region, and a hole injection control gate in contact with the hole injection control gate insulator; and wherein the controllable electron injection structure includes:

an electron injection region in contact with the inorganic phosphor and configured to receive an electron-injection bias voltage, an electron injection control gate insulator layer in contact with the inorganic phosphor substantially opposite the electron injection region, and an electron injection control gate in contact with the electron injection control gate insulator.

36. The electroluminescent device of claim 35, wherein the hole injection region is located on the opposite side of the inorganic phosphor from the electron injection region.

37. The electroluminescent device of claim 36, wherein a portion of the hole injection control gate is opposite a portion of the electron injection control gate.

38. The electroluminescent device of claim 35, wherein the hole injection region is located on the same side of the inorganic phosphor as the electron injection region.

39. The electroluminescent device of claim 35, wherein the hole injection control gate insulator and the electron injection control gate insulator are formed of a single layer.

* * * * *

UNITED STATES PATENT AND TRADEMARK OFFICE
CERTIFICATE OF CORRECTION

PATENT NO. : 7,151,338 B2 Page 1 of 1
APPLICATION NO. : 10/677940
DATED : December 19, 2006
INVENTOR(S) : Hoffman

It is certified that error appears in the above-identified patent and that said Letters Patent is hereby corrected as shown below:

In the Claims

Col. 8 (line 61), delete "GaS," and insert therefor --CaS,--.

Signed and Sealed this

Fourteenth Day of August, 2007

JON W. DUDAS
*Director of the United States Patent and Trademark Office*